(12) United States Patent
Kim

(10) Patent No.: US 10,820,055 B2
(45) Date of Patent: Oct. 27, 2020

(54) METHOD AND SYSTEM FOR DISPLAYING A MENU WHICH HAS AN ICON AND ADDITIONAL INFORMATION CORRESPONDING TO STORED IMAGE DATA, WHEREIN THE ICON CAN DISPLAY THE IMAGE DATA WITH THE ADDITIONAL INFORMATION

(71) Applicant: SAMSUNG ELECTRONICS CO., LTD., Suwon-si (KR)

(72) Inventor: Eung-sun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 836 days.

(21) Appl. No.: 14/792,019

(22) Filed: Jul. 6, 2015

(65) Prior Publication Data

US 2015/0312638 A1    Oct. 29, 2015

Related U.S. Application Data

(63) Continuation of application No. 14/632,394, filed on Feb. 26, 2015, which is a continuation of application No. 13/586,812, filed on Aug. 15, 2012, now Pat. No. 8,995,003, which is a continuation of application No. 10/985,867, filed on Nov. 12, 2004, now Pat. No. 8,270,022.

(51) Int. Cl.
| | |
|---|---|
| *H04N 21/472* | (2011.01) |
| *H04N 21/431* | (2011.01) |
| *H04N 5/445* | (2011.01) |
| *H04N 9/87* | (2006.01) |
| *H04N 21/422* | (2011.01) |

(52) U.S. Cl.
CPC ... *H04N 21/47217* (2013.01); *H04N 5/44543* (2013.01); *H04N 9/87* (2013.01); *H04N 21/42219* (2013.01); *H04N 21/4312* (2013.01)

(58) Field of Classification Search
USPC .......................................... 348/333.01–333.19
See application file for complete search history.

(56) References Cited

U.S. PATENT DOCUMENTS

| | | |
|---|---|---|
| 5,444,545 A | 8/1995 | Lee |
| 5,734,719 A | 3/1998 | Tsevdos et al. |

(Continued)

FOREIGN PATENT DOCUMENTS

| | | |
|---|---|---|
| EP | 0 949 825 B1 | 11/2000 |
| JP | 04139970 A | 5/1992 |

(Continued)

*Primary Examiner* — Nicholas Pachol
(74) *Attorney, Agent, or Firm* — Sughrue Mion, PLLC

(57) ABSTRACT

A menu displaying system and method having an icon for editing image data in an AV (Audio and Video) device, the AV device having a recording medium capable of storing image data and audio data, and which is capable of reproducing image data and audio data. The method comprises steps for displaying icons and additional information corresponding to the image data stored at the recording medium, selecting one of the icons displayed, and reproducing image data corresponding to the selected icon. A corresponding program stored at the AV device having a recording media such as a hard disc drive, is then reproduced upon a menu screen such that image data stored at the AV device can be easily observed.

17 Claims, 5 Drawing Sheets

(56) References Cited

U.S. PATENT DOCUMENTS

| | | | |
|---|---|---|---|
| 5,973,694 A | 10/1999 | Steele et al. | |
| 6,118,493 A * | 9/2000 | Duhault | H04N 5/44591 |
| | | | 348/563 |
| 7,360,202 B1 * | 4/2008 | Seshadri | H04L 12/1859 |
| | | | 717/106 |
| 8,032,010 B2 | 10/2011 | Kim et al. | |
| 2001/0009603 A1 | 7/2001 | Ihara et al. | |
| 2002/0063797 A1 | 5/2002 | Aratani et al. | |
| 2002/0136539 A1 | 9/2002 | Nakaya | |
| 2002/0197067 A1 | 12/2002 | Ohnishi | |
| 2004/0013416 A1 * | 1/2004 | Mok | G11B 19/025 |
| | | | 386/243 |
| 2004/0095396 A1 * | 5/2004 | Stavely | G06F 3/04817 |
| | | | 715/838 |
| 2004/0128317 A1 * | 7/2004 | Sull | G06F 17/30849 |
| 2004/0189827 A1 | 9/2004 | Kim et al. | |
| 2004/0201752 A1 | 10/2004 | Parulski et al. | |
| 2005/0058431 A1 | 3/2005 | Jia et al. | |
| 2006/0103662 A1 | 5/2006 | Kim | |

FOREIGN PATENT DOCUMENTS

| | | |
|---|---|---|
| KR | 1998085466 A | 12/1998 |
| KR | 20010051295 A | 6/2001 |
| WO | 02079902 A2 | 10/2002 |

* cited by examiner

| PROGRAM LIST | ICON | TITLE | DATE | LENGTH |
|---|---|---|---|---|
| 211a |  | ART | 2003. 1. 2 | 00:20 |
| 211b |  | K2 | 2003. 1.20 | 01:30 |
| 211c |  | PRETTY WOMEN | 2003. 2. 3 | 02:00 |
| 211d |  | BEACH | 2003. 3. 2 | 01:45 |
| INSTRUCTIONS | ◁△▷ MOVE ↻ RETURN ⏎ ENTER [MENU] EXIT ◀◀ ▶▶ PREV / NEXT PAGE | | | |

METHOD AND SYSTEM FOR DISPLAYING A MENU WHICH HAS AN ICON AND ADDITIONAL INFORMATION CORRESPONDING TO STORED IMAGE DATA, WHEREIN THE ICON CAN DISPLAY THE IMAGE DATA WITH THE ADDITIONAL INFORMATION

CROSS-REFERENCE TO RELATED APPLICATIONS

This is continuation application of U.S. application Ser. No. 14/632,394, filed Feb. 26, 2015, which a continuation application of U.S. application Ser. No. 13/586,812, filed Aug. 15, 2012, which is a continuation of U.S. application Ser. No. 10/985,867, filed Nov. 12, 2004, now U.S. Pat. No. 8,270,022, the entire contents of each of which are hereby incorporated by reference.

BACKGROUND OF THE INVENTION

1. Field of the Invention

The present invention relates to a system and method for displaying a menu. More particularly, the present invention relates to a system and method for displaying a menu having an icon, provided when displaying image data stored upon a recording medium on a menu screen under GUI (Graphic User Interface) circumstances in an AV (Audio and Video) device, the AV device having a hard disc drive or a flash memory as the recording medium.

2. Description of the Related Art

Developments in image data digitization and condensation technologies have resulted in image recording/reproducing devices which are capable of reproducing image data stored upon an optical medium such as a CD-ROM or DVD title. These optical media do not deteriorate significantly even with long use, and can record high quality images and multichannel audio data (for example, 5.1 channel audio). An optical medium such as a DVD title, can record image data and audio data of file sizes up to hundreds of Mbytes and even as large as several Gbytes, and an image recording/reproducing device has been introduced which reproduces just the optical medium. The conventional image recording/reproducing device using an optical medium provides a basic function for reproducing an image data stored upon the optical medium. An OSD (On Screen Display) menu of an image recording/reproducing device can be provided and typically comprises a menu for setting an aspect ratio of a screen, for example, 4:3 and 16:9, when reproducing a DVD title, a menu for setting a format such as NTSC/PAL of image data to be transmitted to a display device such as a television connected with the image recording/reproducing device, and a menu for setting an output form such as Dolby digital and PCM for audio data. The menus are used to define how to reproduce image data or audio data stored at a DVD title or a CD-ROM title simply based on the MPEG-2 format, but if image data is stored upon a certain recording medium such as a flash ROM or a hard disc drive built into an AV device, it is difficult to recognize the content of the image data.

Accordingly, a need exists for a system and method for displaying a menu for easily recognizing image data content with respect to image data recorded in an image reproducing device which is capable of recording/reproducing digital image data.

SUMMARY OF THE INVENTION

The present invention has been developed in order to solve the above and other problems associated with the conventional arrangement. An aspect of the present invention is to provide a system and method for displaying a menu for use in an image reproducing device which is capable of recording/reproducing digital image data, by which, recorded image data can be easily recognized.

According to another aspect of the present invention, a menu displaying system and method is provided for editing image data in an AV (Audio and Video) device which has a recording medium capable of storing image data and audio data, and which is capable of reproducing image data and audio data. The menu displaying method comprises steps for displaying icons and additional information corresponding to the image data stored upon the recording medium, selecting one of the icons displayed, and reproducing image data corresponding to the selected icon.

The step of selecting one of the icons may further comprise steps for locating a cursor on the icon, and calling image data, stored upon the recording medium, from an address in which image data is stored corresponding to the icon under the cursor.

When the cursor is moved out of the icon, the reproducing of the image data corresponding to the icon is stopped.

The step of reproducing the image data further comprises steps for reproducing the image data on the screen at selected speeds, ranging from slower to faster.

The step of reproducing the image data further comprises steps for reproducing the icon which occupies a certain area on the screen.

The icon upon which the cursor can be placed, displays a frame of the MPEG image data stored, preferably a first frame or I frame, on the screen.

BRIEF DESCRIPTION OF THE DRAWINGS

The above aspects and features of the present invention will become more apparent by describing certain embodiments of the present invention with reference to the accompanying drawings, in which.

Throughout the drawings, like reference numerals will be understood to refer to like parts, components and structures.

DETAILED DESCRIPTION OF THE PREFERRED EMBODIMENTS

Figure 1:
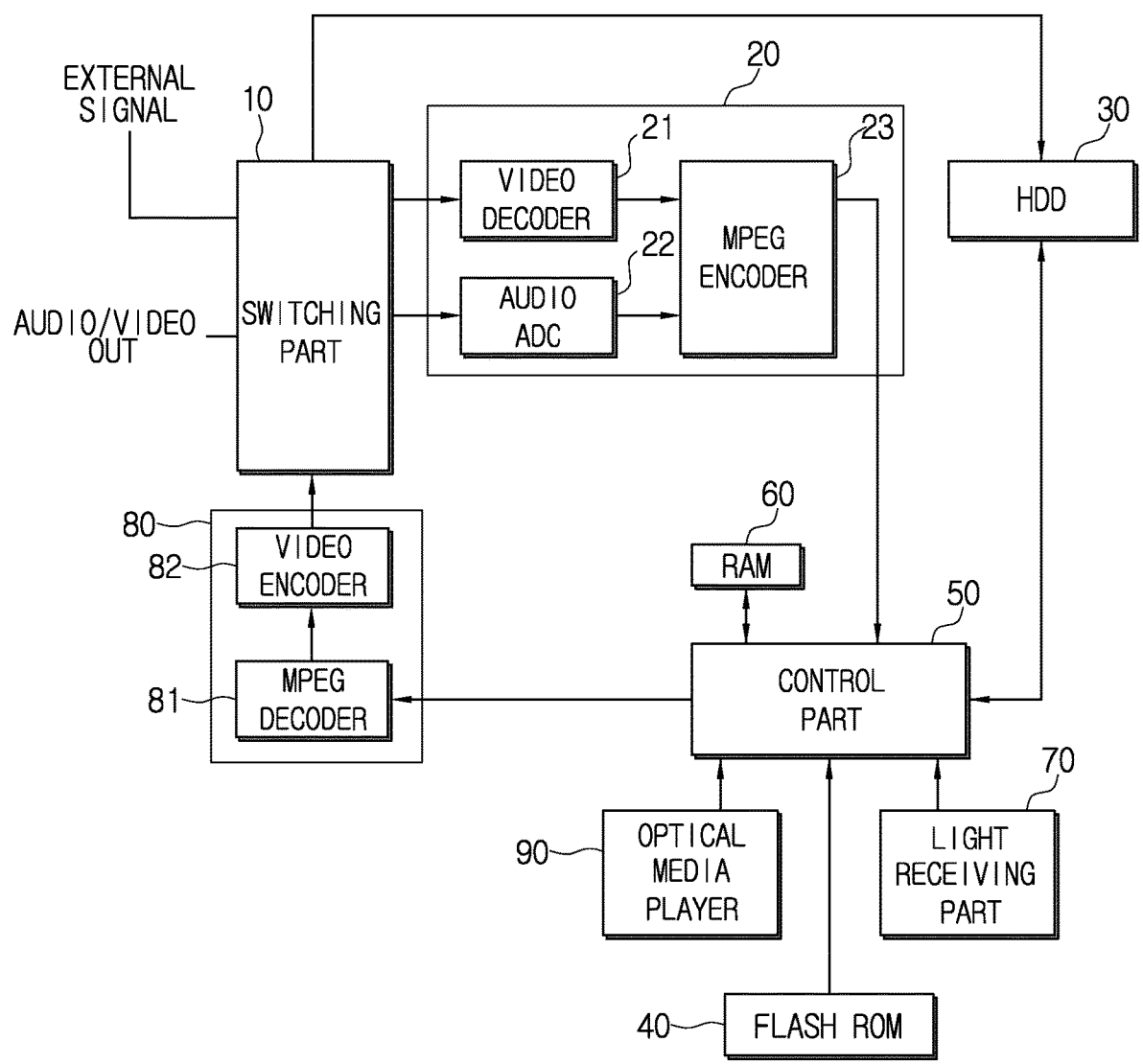
FIG. 1 is a block diagram of an exemplary DVD reproducing device illustrating an AV device to which a menu displaying method can be applied for reproducing an image according to an embodiment of the present invention.

Certain embodiments of the present invention will now be described in greater detail with reference to the accompanying drawings.

In the following description, same drawing reference numerals are used for the same elements even in different drawings. The matters defined in the description such as a detailed description of construction and elements, are provided to assist in a comprehensive understanding of the invention. Also, functions or constructions which are well known to those skilled in the art are not described in detail since they would obscure the invention in unnecessary detail.

FIG. 1 is a block diagram of an exemplary DVD reproducing device illustrating an AV device to which a menu displaying method can be applied for reproducing an image according to an embodiment of the present invention.

The depicted DVD reproducing device comprises a switching part 10, an MPEG encoder part 20, an HDD (hard disc drive) 30, a Flash ROM 40, a control part 50, a RAM 60, a light receiving part 70, a decoder part 80, and an optical media player 90.

The switching part 10 receives various external image data/audio data, and outputs image data from the decoder part 80 to outside devices, such as a monitor screen. The switching part 10 receives external signals such as a broadcast signal, and component and composite signals sent from a video (not shown), and selectively connects each to a function block of an image recording/reproducing device. For example, when the external signal sent from an external device such as a video, is a component or composite signal, the switching part 10 transmits the signal to the MPEG encoder part 20.

The MPEG encoder part 20 converts analog image data to digital image data, and compresses the digital image data into an MPEG format such as MPEG-2 format. In general, image data in MPEG format is compressed such that the requirement for storage space can be reduced when storing upon a recording medium such as the HDD 30.

The HDD 30 stores the MPEG image data/audio data as a file. The MPEG image data/audio data, among the image data received at the switching part 10, can be stored as they are received. For an exemplary implementation of the present invention, the above embodiment depicts the HDD 30 as storing MPEG-2 image data as a file. However, this should not be considered as limiting. The HDD 30 may store data in MPEG-1, MPEG-2, and MPEG-4 formats. Furthermore, in the exemplary embodiment, the MPEG encoder part 20 and the decoder part 80 encode and decode data according to an MPEG-2 format, however, each may encode and decode data in MPEG-1, MPEG-2 and MPEG-4 formats.

The Flash ROM 40 stores an operating system for operating a DVD reproducing device, and further includes application programs for displaying image/audio files of the HDD 30 and additional information in GUI (Graphic User Interface) menu form on a screen. The Flash ROM 40 further includes application programs for editing and displaying the image data/audio data of the HDD 30 via the displayed menu.

The control part 50 stores MPEG data output from the MPEG encoder part 20 at the HDD 30, or transmits image data/audio data stored at the HDD 30 to the decoder part 80. The control part 50 performs an application program stored at the Flash ROM 40, displays an icon corresponding to the image data file of the HDD 30, and reproduces on a menu, the icon selected by a control signal (not shown) received from a remote controller (not shown).

The RAM 60 loads a file when the control part 50 edits the file stored at the HDD 30. That is, the control part 50 does not directly edit a file stored at the HDD 30, but the RAM 60 edits the file, and the edited file is then stored again at the HDD 30.

The light receiving part 70 receives a control signal (not shown) generated from a remote controller (not shown), or from a setting key (not shown) built in the image recording/reproducing device for controlling various tasks, for example, converting channels and adjusting volume and image quality of the image recording/reproducing device, and then transmits the control signal to the control part 50.

The decoder part 80 receives MPEG image data stored at the HDD 30 via the control part 50, and converts the data into a video format such as NTSC/PAL. The converted signal can then be reproduced at an image display device such as a television (not shown). The optical media player 90 reads image data and audio data from a DVD title, and transmits the data to the control part 50. The image data and audio data transmitted to the control part 50 are either stored at the HDD 30, or transmitted to the MPEG decoder part 80 to be reproduced.

Figure 2:
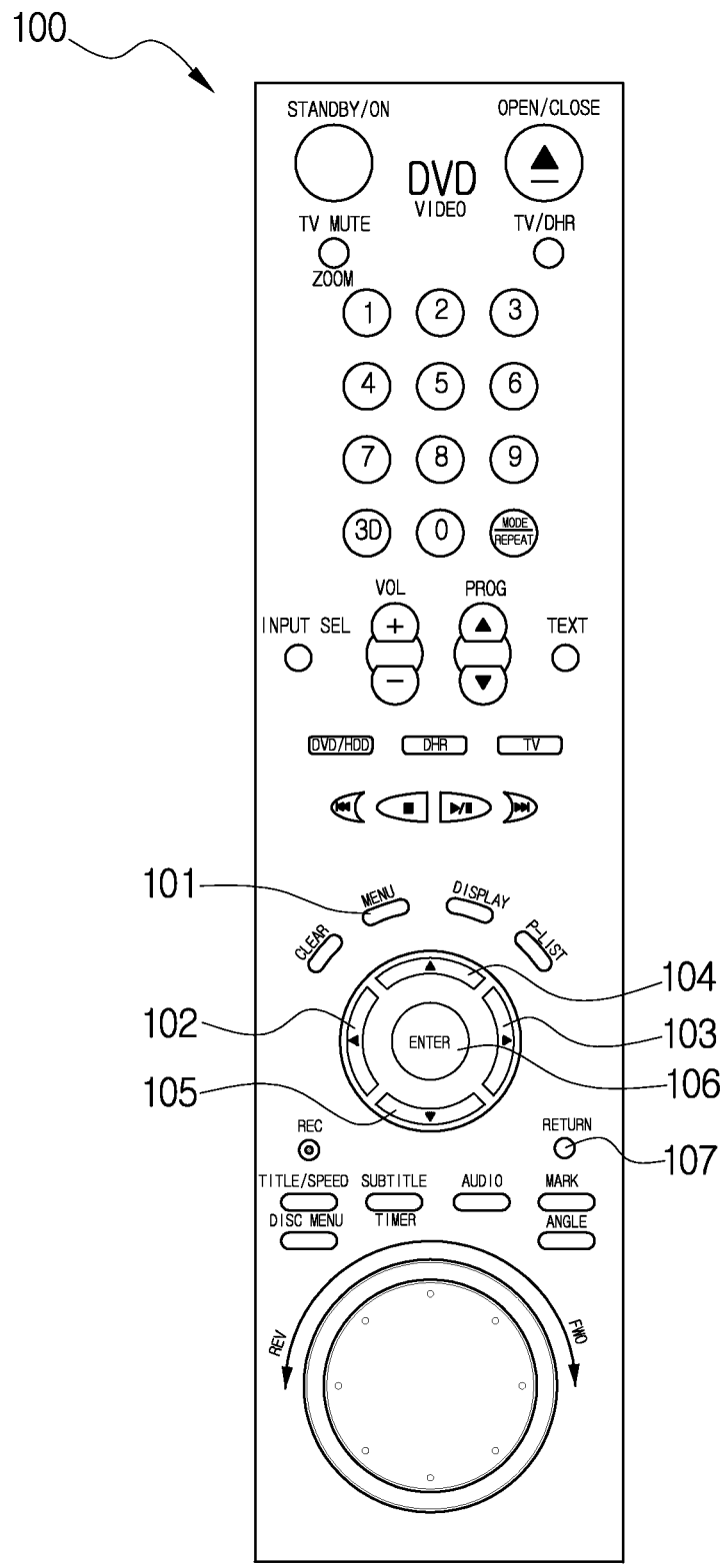
FIG. 2 is a view of an exemplary remote controller for controlling the DVD reproducing device of FIG. 1 from a distance.

FIG. 2 is a view of an exemplary remote controller of the DVD reproducing device of FIG. 1. The remote controller 100 has a menu key 101 for instructing the loading, opening, and closing of a menu screen, and left, right, up and down direction keys 102, 103, 104, and 105, respectively, for instructing movement among menus on the menu screen. The enter key 106 is provided for selecting a menu, and the return key 107 is provided for returning the present screen to a previous screen.

Additional keys are provided for operating an image recording/reproducing device (not shown) and an image display device (not shown) such as a television. The functions of these keys can be easily recognized by markings indicated adjacent to or upon each of the keys, and therefore, a detailed description of each of the remaining keys will be omitted.

Figure 3:
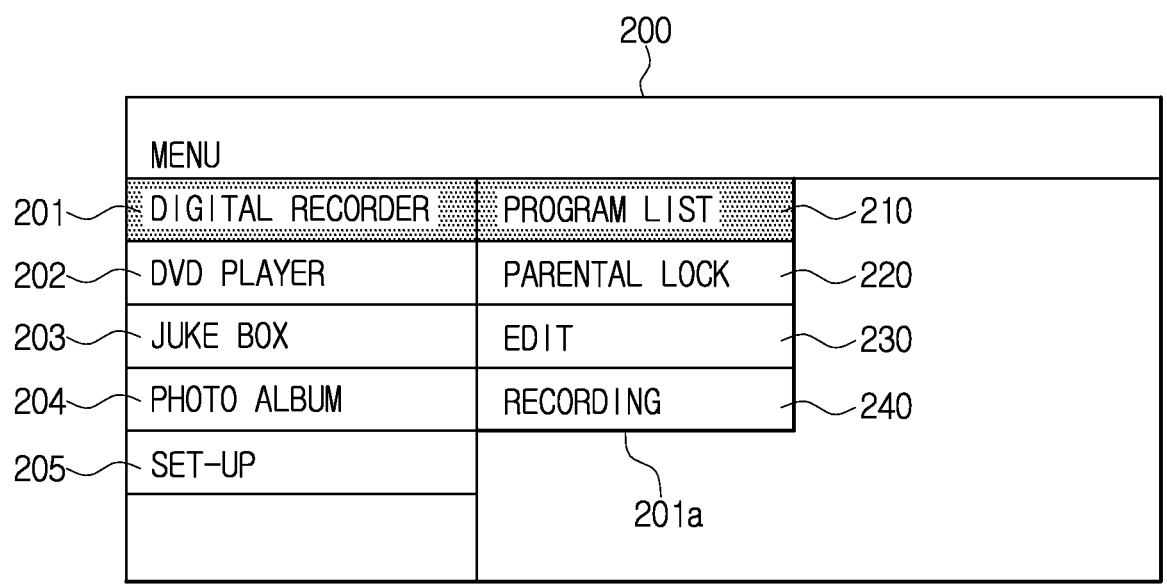
FIG. 3 is a view of an exemplary initial menu guide screen that can be provided when the menu key of FIG. 2 is selected.

FIG. 3 is a view of an exemplary initial menu guide screen which can be provided when the menu key 101 of FIG. 2 is selected. In the example shown in FIG. 3, the digital recorder menu 201 is also selected which results in a sub-menu display 201a.

When the menu key 101 of the remote controller 100 is pressed, a corresponding control signal (not shown) is transmitted to the light receiving part 70, and the control part 50 calls an application program stored at the Flash ROM 40 to display the menu in GUI form on the screen.

The displayed menu 200 comprises a digital recorder menu 201 for managing data stored at the HDD 30, a DVD player menu 202 for reproducing a DVD title inserted in the optical media player 90, a juke box menu 203 for reproducing or storing a music CD at the HDD 30 when a CD-DA standard music CD is inserted, a photo album menu 204, and a set-up menu 205.

The sub-menu 201a is displayed on the screen when the digital recorder menu 201 is selected. As depicted, the sub-menu 201a of the digital recorder menu 201 comprises a Program List menu 210 showing a list of image data stored at the HDD 30, a Parental Lock menu 220 for limiting viewer's access to a certain program such as an adult program, an Edit menu 230 for editing image data stored at the HDD 30, and a Recording menu 240 for recording a broadcast program according to a preset time.

Figure 4:
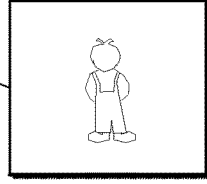
FIG. 4 is a view of an exemplary menu displayed on the screen when the program list menu is selected on the initial menu guide screen of FIG. 3.
Figure 4:
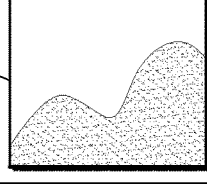
Figure 4:
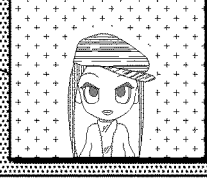
Figure 4:
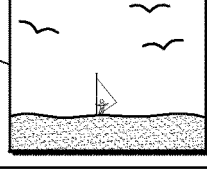

FIG. 4 is a view of an example of a menu displayed on the screen when the program list menu 210 is selected on the initial menu guide screen of FIG. 3. The program list menu 210 comprises an icon menu 211 of icons 211a to 211d corresponding to programs stored at the HDD 30, a Title identification part 212 for indicating a program title corresponding to each icon 211a to 211d, a date identification part 213 for indicating the stored time of each program at the HDD 30, and a reproducing length time identification part 214 for indicating a reproducing time of each program. Each of icons 211a to 211d is displayed on the first start frame, that is, an I frame, of MPEG image data stored at the HDD 30, and has information on a start address of the corresponding program stored at the HDD 30.

Figure 5:
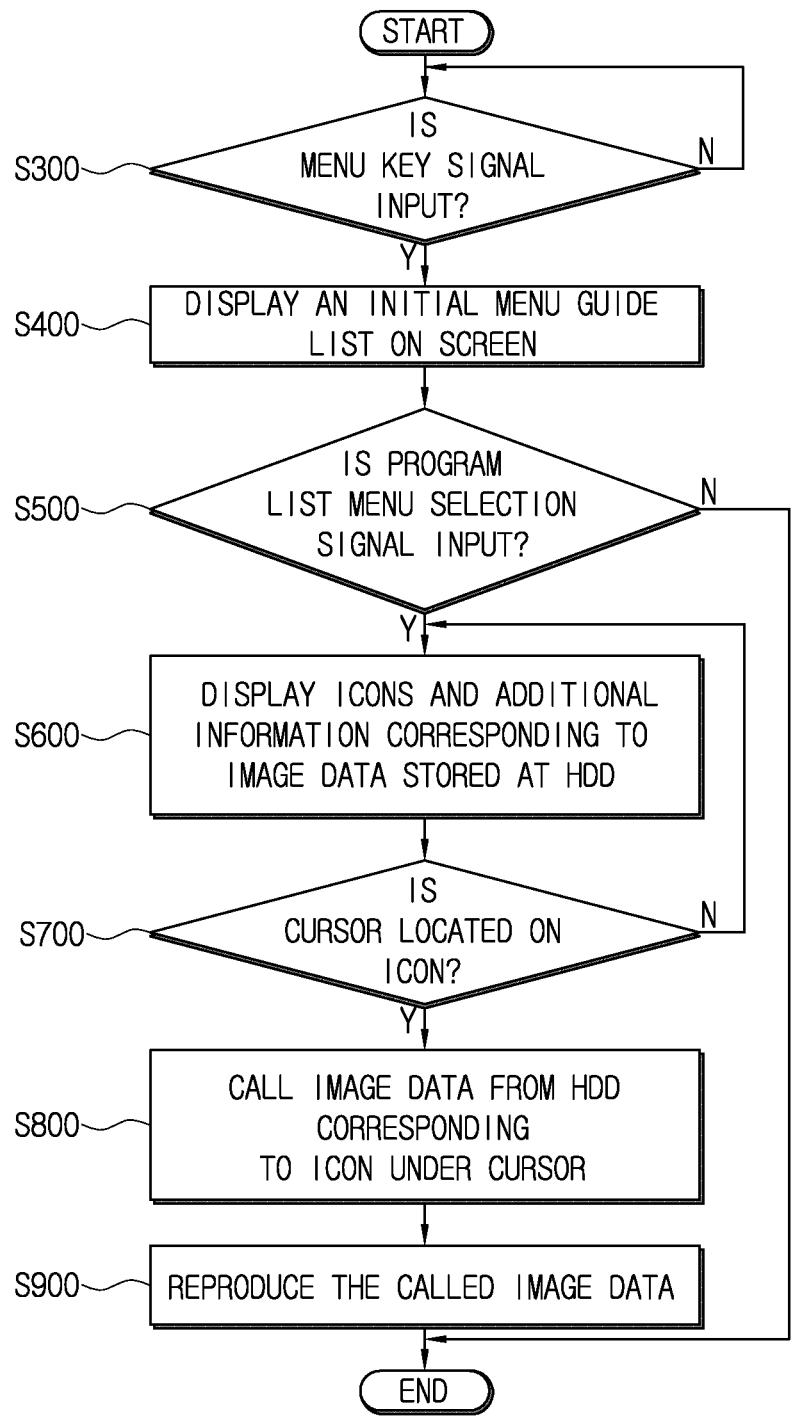
FIG. 5 is a flow chart illustrating an exemplary method for displaying a menu having an icon according to an embodiment of the present invention.

FIG. 5 is a flow chart illustrating a method for displaying a menu having an icon according to an embodiment of the present invention. In order to display the program list menu 210 of image data stored at the HDD 30 on the screen, the program list menu 210 should be selected on the initial menu guide screen 200. When the menu key 101 is pressed on the remote controller 100, a control signal (not shown) generated from the remote controller 100 is transmitted to the light receiving part 70, and the control part 50 detects the transmission at step S300, and displays the initial menu guide screen 200 on the screen as shown in FIG. 3 at step S400.

When a cursor is located on the program list menu 210 on the initial menu guide screen 200 by the use of direction keys 102 to 105 and the enter key 106 is pressed, a control signal generated from the remote controller 100 is transmitted to the light receiving part 70. The control part 50 detects the transmission at step S500 and displays the menu 210 as shown in FIG. 4 on the screen at step S600. The icons 211a to 211d are displayed in forms of still images on the menu displayed on the screen and which correspond to programs stored at the HDD 30. The title, storing time, and reproducing time of the programs are indicated adjacent to each of icons 211a to 211d.

At step S700, when the direction keys 102 to 105 are pressed to locate a cursor on one of a plurality of icons 211a to 211d on the program list menu 210 on the screen as shown in FIG. 4, an icon under the cursor calls a program stored at the HDD 30 at step S800. The still image of the icon represents the first start frame, that is, an I frame, of a program stored at the HDD 30, and specifically, when a cursor is located on one of the icons 211a to 211d, a corresponding program is loaded from the HDD 30 to be reproduced at step S900. The size of the image data provided in response to the call of an icon and reproduced on the screen is substantially the same size as the icons 211a to 211d. That is, the selected icon of icons 211a to 211d displayed on the program list menu 210, is reproduced and displayed as moving images within the same position. When an icon, for example 211a, under the cursor is reproduced as a moving image, and the cursor is moved to another icon, for example 211b, the reproduction of the moving images corresponding to the icon 211a is stopped, and a moving image is reproduced on the screen corresponding to the icon 211b currently under the cursor.

The icon 211a, which is no longer reproduced, may then again be displayed on the screen as a still image of the initial I frame of the program corresponding to the icon 211a.

In order to reproduce image data in the areas of icons 211a to 211d slower or faster, the direction keys 102 and 103 of the remote controller 100 may be pressed to set desired reproduction speeds, such as 2 times an original speed, 4 times an original speed, or ½ times an original speed. For example, if the direction key 102 is pressed once, ½ times an original speed may be set as the reproduction speed, and if the direction key 102 is pressed once more, ¼ times an original speed may be set as the reproduction speed. If the direction key 103 is pressed once, 2 times an original speed may be set as the reproduction speed, and if pressed once more, 4 times an original speed may be set as the reproduction speed.

If a user desires to know which program is stored at the HDD 30, the user may simply locate a cursor on the icons 211a to 211d in which the first frame (I frame) of each program is displayed, such that the contents of each program corresponding to each icon are displayed on the screen, and the user can then easily observe the contents of the program.

As described above, a program stored at an AV device having a recording medium such as a hard disc drive, is reproduced in a menu screen according to an embodiment of the present invention, and therefore, image data stored at the AV device can be easily observed.

The foregoing embodiments and advantages are merely exemplary and are not to be construed as limiting the present invention. The present teachings can be readily applied to other types of apparatuses. Also, the description of the embodiments of the present invention is intended to be illustrative and not to limit the scope of the claims, and many alternatives, modifications, and variations will be apparent to those skilled in the art.

The invention claimed is:

1. A video apparatus, comprising:
a control signal receiver configured to receive a control signal from a remote controller of the video apparatus;
a display; and
a processor implementing a controller configured to:
control the display to display a cursor of which a display position is controlled by the control signal, the control signal associated with a direction key of the remote controller;
control the display to display a video list regarding a plurality of video contents, the video list comprising a plurality of video items, wherein each of the plurality of video items links to a corresponding video content from the plurality of video contents and includes a still image in association with a corresponding video content;
in response to the cursor being located on a first video item from among the plurality of video items, corresponding to a first video content from the plurality of video contents, based on the control signal, control the display to stop the display of a first still image corresponding to the first video content and to display a moving image corresponding to the first video content in an area associated with the first video item while the video list, including a second still image corresponding to a second video content, from among the plurality of video items, is displayed;
in response to the cursor being moved out from the first video item, from among the plurality of video items, based on the control signal while the moving image corresponding to the first video content is displayed, stop the display of the moving image corresponding to the first video content and control the display to resume the display of the first still image; and
in response to the cursor being located on the second video item, based on the control signal after the display of the first still image is resumed, control the display to stop the display of the second still image corresponding to the second video content and to reproduce a moving image corresponding to the second video content in the area associated with the second video item while the video list including the first still image is displayed.

2. The video apparatus as claimed in claim 1, wherein the controller is further configured to control the display to display the moving image corresponding to the first video item in an area of the display based on a position of the first video item.

3. The video apparatus as claimed in claim 2, wherein a first area in which the moving image corresponding to the first video item is displayed is a same area as a second area in which the first video item is displayed.

4. The video apparatus as claimed in claim 1, wherein the controller is further configured to generate the moving image corresponding to the first video content.

5. The video apparatus as claimed in claim 1, wherein the still image comprises an I frame included in a corresponding video content.

6. The video apparatus as claimed in claim 1, wherein the controller is further configured to control the display for displaying the still image read out from the corresponding video content, and play time information of the corresponding video content if the cursor is moved off the corresponding video item of the corresponding video content.

7. The video apparatus as claimed in claim 1, further comprising a storage medium configured to store the plurality of video data, the storage medium comprising at least one of a hard disk drive, RAM and flash ROM.

8. The video apparatus as claimed in claim 1, wherein the display has a first size, the moving image corresponding to the first video content is displayed in an area having a second size, and the first size is larger than the second size.

9. A non-transitory computer readable medium storing instructions executable by a processor to cause the processor to:
control a display to display a cursor of which a display position is controlled by a control signal from a remote controller, the control signal associated with a direction key of the remote controller;
control the display to display a video list regarding a plurality of video contents, the video list comprising a plurality of video items, wherein each of the plurality of video items links to a corresponding video content from the plurality of video contents and includes a still image in association with a corresponding video content;
in response to the cursor being located on a first video item from among the plurality of video items, corresponding to a first video content from the plurality of video contents, based on the control signal, control the display to stop the display of a first still image corresponding to the first video content and to display a moving image corresponding to the first video content in an area associated with the first video item while the video list, including a second still image corresponding to a second video content, from among the plurality of video contents, is displayed;
in response to the cursor being moved out from the first video item, from among the plurality of video items, based on the control signal while the moving image corresponding to the first video content is displayed, stop the display of the moving image corresponding to the first video content and control the display to resume the display of the first still image; and
in response to the cursor being located on the second video item, based on the control signal after the display of the first still image is resumed, control the display to stop the display of the second still image corresponding to the second video content and to reproduce a moving image corresponding to the second video content in the area associated with the second video item while the video list including the first still image is displayed.

10. The non-transitory computer readable medium as claimed in claim 9, wherein the instructions executable by the processor further cause the processor to control the display to display the moving image corresponding to the first video item in an area of the display based on a position of the first video item.

11. The non-transitory computer readable medium as claimed in claim 10, wherein a first area in which the moving image corresponding to the first video item is displayed is a same area as a second area in which the first video item is displayed.

12. The non-transitory computer readable medium as claimed in claim 9, wherein the instructions executable by the processor further cause the processor to generate the moving image corresponding to the first video content.

13. The non-transitory computer readable medium as claimed in claim 9, wherein the still image comprises an I frame included in a corresponding video content.

14. The non-transitory computer readable medium as claimed in claim 9, wherein the instructions executable by the processor further cause the processor to control the display for displaying the still image read out from the corresponding video content, and play time information of the corresponding video content if the cursor is moved off the corresponding video item of the corresponding video content.

15. The non-transitory computer readable medium as claimed in claim 9, wherein a storage medium stores the plurality of video data, the storage medium comprising at least one of a hard disk drive, RAM and flash ROM.

16. The non-transitory computer readable medium as claimed in claim 9, wherein the display has a first size, the moving image corresponding to the first video content is displayed in an area having a second size, and the first size is larger than the second size.

17. A method performed by a video apparatus, the method comprising:
controlling a display to display a cursor of which a display position is controlled by a control signal from a remote controller, the control signal associated with a direction key of the remote controller;
controlling the display to display a video list regarding a plurality of video contents, the video list comprising a plurality of video items, wherein each of the plurality of video items links to a corresponding video content from the plurality of video contents and includes a still image in association with a corresponding video content;
in response to the cursor being located on a first video item from among the plurality of video items, corresponding to a first video content from the plurality of video contents, based on the control signal, controlling the display to stop the display of a first still image corresponding to the first video content and to display a moving image corresponding to the first video content in an area associated with the first video item while the video list, including a second still image corresponding to a second video content, from among the plurality of video contents, is displayed;
in response to the cursor being moved out from the first video item, from among the plurality of video items, based on the control signal while the moving image corresponding to the first video content is displayed, stopping the display of the moving image corresponding to the first video content and controlling the display to resume the display of the first still image; and in response to the cursor being located on the second video item, based on the control signal after the display of the first still image is resumed, control the display to stop the display of the second still image corresponding to the second video content and to reproduce a moving image corresponding to the second video content in the area associated with the second video item while the video list including the first still image is displayed.

* * * * *